3,091,967
SWIPE SAMPLER
William R. Hurdlow, Livermore, Calif., Bruce B. Boecker, Naperville, Ill., and Rulon E. Johnson, Jr., Newark, Del., assignors to the United States of America as represented by the Secretary of the Air Force
Filed May 13, 1960, Ser. No. 29,121
2 Claims. (Cl. 73—425)
(Granted under Title 35, U.S. Code (1952), sec. 266)

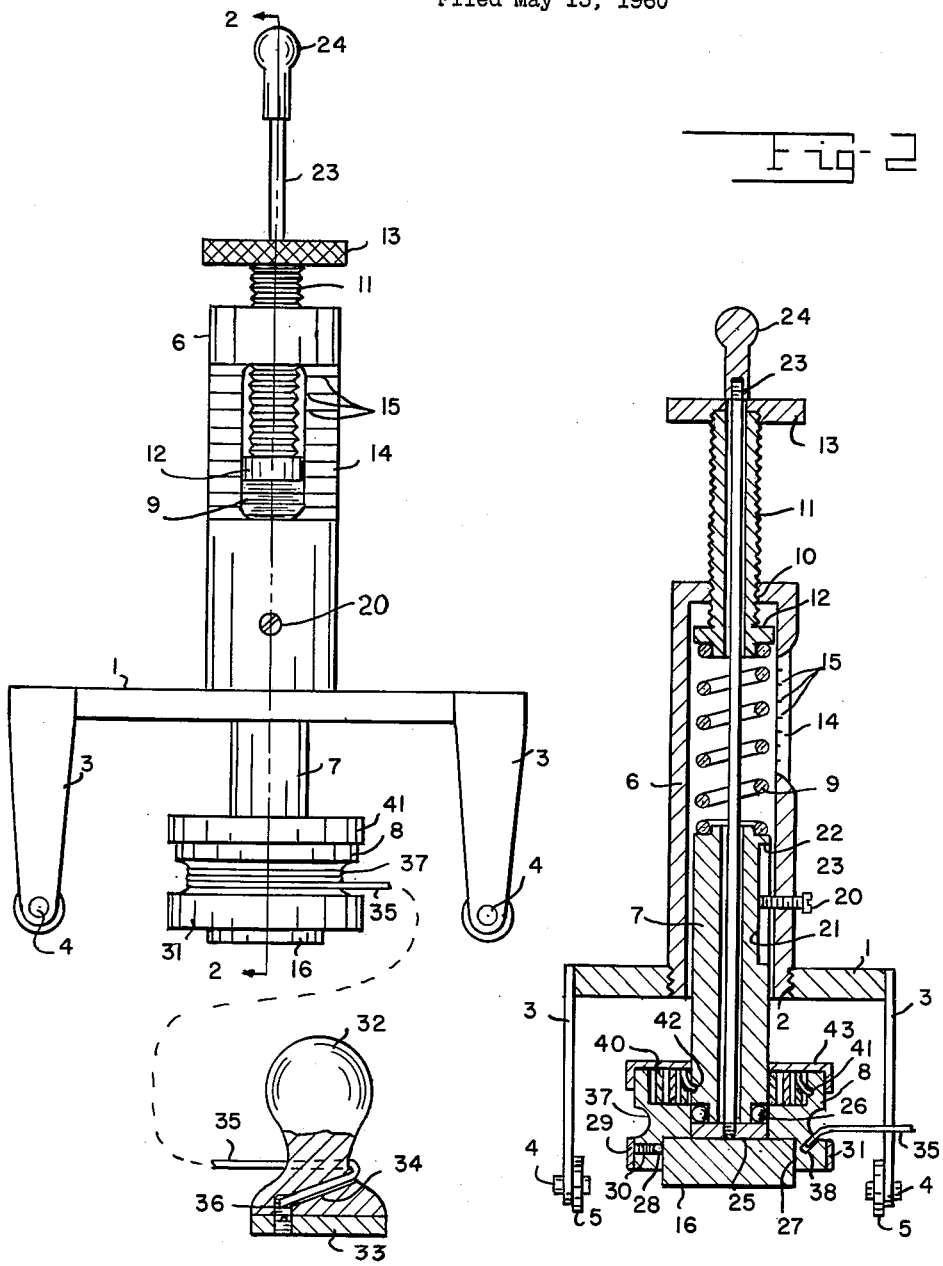

The invention described herein may be manufactured and used by and for the United States Government for governmental purposes without payment to us of any royalty thereon.

The present invention relates to an apparatus adapted to rub a swipe sample collecting disc across a contaminated surface to obtain a sample of the removable contamination from the surface and to deposit it on the sample disc. Swipe sampling is the process of rubbing or rotating a sampling disc on a contaminated surface and then identifying the contaminant and determining its quantity.

The present invention is an apparatus that has been used successfully to obtain swipe samples of radio active contamination from the surfaces of aircraft and other extended area surfaces without manual contact therewith. While its primary use has been in the taking of radio active samples from contaminated surfaces, the device is capable of being used to collect samples of many different types of removable matter from an extended surface. A typical example of such removable matter would be that of bacteria found on an extended surface.

Previous methods of obtaining samples of contamination often resulted in the objectionable experience, of the person taking the sample coming into actual contact with the contaminated material. A person using the apparatus of the instant invention to obtain a sample of contamination is not required to come directly into contact with the contaminated surface for an extended period of time, nor is he required to come in direct contact with the sample disc upon which the sample of contamination has been collected.

Previous methods of obtaining samples of contamination often resulted in an inaccurate sample due to the variance of the pressure with which the sample collecting means was brought into contact with the contaminated surface. In addition, inaccuracies of the sample taken were often present due to variations in the areas covered. In previous methods used, unequal distribution of contamination on the sample collecting means often occurred due to the fact that the sample collecting means were not uniformly rotated during the sampling operation.

The present invention has overcome all of the above difficulties found in the prior art. The apparatus of the instant invention may be operated remotely from the surface being sampled in such a manner that the operator of the apparatus is not required to come in contact with the contaminated surface for an extended period of time or in contact with the sample collecting disc. In operation the apparatus places the sample disc against the contaminated surface at a constant pressure to avoid any inaccurate sampling due to a variance in the manual pressure applied and then rotates the disc uniformly. In addition the apparatus includes means to allow tthe operator to measure the area covered by the sampling disc.

FIGURE 1 is an elevational view showing the swipe sampler and with parts of a rotation knob part thereof broken away and in section; and FIGURE 2 is an axial sectional view taken along the line 2—2 in FIGURE 1, showing the functional elements of the swipe sampler.

The present invention comprises a portable base assembly having a base plate 1 with a central threaded opening 2 therein. A cylindrical housing 6 has its lower end threaded into the central opening 2 of the base plate 1. Legs 3 are mounted at the four corners of the base plate by being welded securely thereto or the like and extend downwardly therefrom. A headed pin 4 is transversely mounted through each of the legs adjacent the lower end thereof. A wheel 5 is rotatably mounted on each of said pins 4 and is secured thereto by a nut, a cotter pin or the like, none of which are shown. An axially bored cylinder 7 is slidably mounted for axially directed motion in the lower end of the cylindrical housing 6 and continues through the central opening 2 of the base plate 1 below the base plate. A disc-shaped sampling head 8 is rotatably mounted on the lower end of the cylinder 7.

The cylindrical housing 6 extends upwardly from the base assembly plate 1 and houses the upper portion of the narrow bored cylinder 7 and a compression spring 9. The top of the cylindrical housing 6 is closed and contains a threaded aperture 10 which receives a threaded cylinder 11. The cylinder 11 extends down into the housing 6. The lower end of the threaded cylinder 11 includes a disc portion 12 that engages the upper end of the spring 9. An upper disc or knob 13, having a knurled periphery, is threaded on the upper end of the threaded cylinder 11 for use in the longitudinal adjustment of the cylinder with respect to the housing 6.

Mounted within the cylindrical housing 6 between the upper end of the cylinder 7 and the lower face of the disc 12 is the compression spring 9. The compression spring 9 biases downwardly the cylinder 7, to which the sampling head 8 is rotatably attached.

A longitudinal slot 14 extends axially through the wall of the cylindrical housing 6 giving the operator of the apparatus a view of the relative longitudinal position of the disc 12.

Indicia 15 are placed on the cylindrical housing along the edge of the slot 14 to aid the operator in determining the relative force being exerted by the spring 9 on the cylinder 7 which in turn transmits the force to the sample disc 16 releasably retained in the recess 27. The relative force being exerted by the spring 9 may be adjusted by moving the threaded cylinder 11 by the rotation of the knurled knob 13 thereby changing the position of the disc 12 within the cylindrical housing 6.

A stop screw 20 is threadedly mounted in the lower portion of the cylindrical housing and extends through the wall of the cylindrical housing into a longitudinal slot 21 in the wall of the narrow bored cylinder 7. The stop screw 20 allows the cylinder 7 to move vertically to a lower position where it engages the end or shoulder 22 of the slot 21 and in addition it prevents any rotation of the cylinder 7 with respect to the housing 6. Extending through the threaded cylinder 11, the cylindrical housing 6 and the narrow bored cylinder 7 is an elongated rod 23 having a spherical knob 24 threaded to its upper end and a plate disc 25 threaded to its lower end.

The disc-shaped sampling head 8 is rotatably mounted on the lower end of the cylinder 7 by means of a bearing 26. A circular recess 27 in the lower side of the sampling head 8 releasably receives and retains a sample disc 16. Mounted in the sides of the sampling head 8 surrounding the recess 27 are the small spring biased metal balls 28 and the springs 29. The spring biased balls 28 are slidably mounted in circular channels 30 that also house the springs 29. The apertures formed at the inner ends of the channels 30 are slightly smaller in diameter than the diameter of the balls 28 but are of sufficient diameter to allow a substantial portion of the balls to project inwardly from the apertures. The springs 29 are retained in the channels by a circular band 31 which extends around the outer lower portion of the disc-shaped sampling head 8. The small spring biased metal balls 28 releasably engage the sides of the sample disc 16 to retain it in the recess 27 by making small indentations in the sides of the sample disc. The sample disc 16 may be made of any material that is at least somewhat resilient and capable of holding a sample of the contamination that is being collected.

The plate disc 25 is seated in a recess of similar configuration in the lower face of the sampling head 8. The disc 25 engages the upper side of the sampling disc 16 which is releasably retained within the recess 27. The depressed compression spring 9 holds the sample collecting disc 16 against a surface from which the contamination sample is to be taken at a uniform pressure. With the spring 9 depressed the sample disc 16 is ejected from the housing by the action of the disc 25 upon the depression of the elongated rod 23. This ejection means makes it possible to remove the sampling disc 16 from the sampling head without the operator of the apparatus being required to come in direct contact with the contaminated sampling disc.

To enable a contamination sample to be taken from a surface without the operator of the apparatus being required to come into extended direct contact with the contaminated surface, means are provided to facilitate moving the apparatus across the contaminated surface by remote control.

A knob 32 has a flat base portion 33 and contains a narrow channel or aperture 34 into which the end of an elongated wire 35 is inserted and held in place by the set screw 36. The wire 35 extends from the knob 32 to the disc-shaped head 8 where it is coiled about a channel or groove 37. The end of the wire 35 at the sampling head 8 is secured in an aperture 38 by solder or the like. A spring 40 is contained in a recess in the upper side of the disc-shaped head 8 and is attached by soldering or welding at one end to the disc-shaped sampling head at 41 and at the other end at 42 to the narrow bored cylinder 7. Rotation of the disc-shaped head 8 and the sample disc 16 is accomplished by holding the base plate 1 in place with one hand and with the other hand move the knob 32 away from the base plate assembly and thereby extend the wire 35. As the wire is extended, the spring 40 is wound to create a force to recoil the wire 35 about the groove 37 upon release of the end of wire. The spring 40 is retained in the recess by means of a tight-fitting cover 43 which fits over the upper portion of the disc-shaped head 8.

The sampling operation takes place as follows: A sample disc 16 of suitable material is inserted in the recess 27 where it is retained in position by the spring loaded balls 28. The pressure of the sampling disc 16 upon the surface to be sampled is adjusted to a predetermined level by turning the knurled disc 13 mounted on the threaded rod 11. As the threaded rod 11 is rotated, the spring 9 is either compressed or is allowed to expand thus causing either increased or decreased force on the cylinder 7 and the disc-shaped sampling head 8. The relative pressure being maintained can be determined by the operator by noting the position of the disc 12 in relation to the indicia 15 on the wall of the cylindrical housing 6.

During the operation of the apparatus, the knob 32 is held with its face 33 firmly against the surface and then the base assembly is wheeled a desired distance from the knob 32. This causes the wire 35, which is coiled about the rotatable disc-shaped head 8, to be extended and to impart a rotation to the head 8 and the sample disc 16. As the sample disc 16 contained in the recess is rotated, a uniform distribution of contamination is deposited on the lower surface of the sample disc. If desired, the sampling operation may be conducted by holding the base assembly in place and then moving the knob 32 a desired distance to impart rotation to the head and to thereby obtain a sample of contamination at one point.

The wire 35 is calibrated to enable the operator of the apparatus to make an accurate determination of the area swiped or the number of rotations made by the sample disc. When the sampling operation has been completed, the contaminated sample disc 16 is removed from the recess 27 by depressing the elongated rod 23 until the plate disc 25 engages the sample disc and the disc is forced out of the recess.

While the form of the apparatus described constitutes a preferred embodiment of the invention, it is to be understood that the invention is not limited to this precise form of apparatus, and that changes and modification may be made therein without departing from the scope of the invention which is defined in the appending claims.

What is claimed is:

1. A swipe sampler for removing a contamination sample from a contaminated surface comprising a base assembly having an opening at its center portion, a vertical cylindrical housing mounted in the opening in said base assembly, a bored cylinder slidably mounted in the lower end of the cylindrical housing, a sampling head rotatably mounted on the lower end of the bored cylinder, a sample disc, means releasably retaining the sample disc in the sampling head, a compression spring mounted in the cylindrical housing and biased to hold the sample disc against the surface being sampled, means for adjusting a predetermined pressure of the compression spring, indicia on the cylindrical housing indicating the pressure exerted on the sample disc by the compression spring when the sample disc is against the surface being sampled, means for rotating the sample disc, means joined to base assembly and adapted for rolling the base assembly on the surface being sampled, and means adapted for ejecting the sample disc upon completion of the sampling operation.

2. A swipe sampler for removing a contamination sample from a contaminated surface comprising a base assembly having a central opening therein, a plurality of wheels joined to and supporting said base assembly, a vertical cylindrical housing mounted in the opening in said base assembly, an axially bored cylinder slidably mounted for axial movement within said cylindrical housing and protruding from the lower end of said cylindrical housing, a sampling head rotatably mounted on the lower end of said bored cylinder, a sample disc made of material capable of holding a sample of the contaminant being collected, means releasably retaining the sample disc in a recess in the lower face of said sampling head, means for rotating said sampling head and retained sample disc in relation to said bored cylinder, spring means contained in a recess in the upper face of said sampling head, said spring means being adapted to rotatably return said sampling head to its initial position in relation to said bored cylinder, a compression spring mounted in the cylindrical housing and biased to hold the sample disc against the surface being sampled, means for adjusting a predetermined pressure of the compression spring, indicia on the cylindrical housing indicating the pressure exerted on the sample disc by the compression spring when the sample disc is against the surface being sampled, and a rod adapted for ejecting the sample disc upon completion of the sampling operation.

References Cited in the file of this patent

UNITED STATES PATENTS

| 762,852 | Tooker | June 14, 1904 |
| 3,074,276 | Moos | Jan. 22, 1963 |

FOREIGN PATENTS

| 72,632 | Austria | Oct. 25, 1916 |